United States Patent [19]

Carlsmith

[11] 3,964,962

[45] June 22, 1976

[54] GASEOUS REACTION APPARATUS AND PROCESSES INCLUDING A PERIPHERAL GAS RECEIVING CHAMBER AND A GAS RECIRCULATION CONDUIT

[75] Inventor: Lawrence A. Carlsmith, Amherst, N.H.

[73] Assignee: Ingersoll-Rand Company, Woodcliff Lake, N.J.

[22] Filed: Feb. 25, 1974

[21] Appl. No.: 445,212

[52] U.S. Cl. .................... 162/236; 68/5 C; 162/41; 162/43; 162/44; 162/47; 162/63; 162/65; 162/237; 162/246
[51] Int. Cl.² .................... D21C 7/00; D21C 7/06
[58] Field of Search .................... 162/41, 44, 42, 46, 162/43, 47, 235, 236, 237, 233, 242, 243, 246, 251, 52, 63, 65, 24; 68/5 C

[56] References Cited
UNITED STATES PATENTS

| | | |
|---|---|---|
| 1,633,735 | 6/1927 | Fish, Jr. .................... 162/44 |
| 1,669,234 | 5/1928 | Dunbar .................... 162/242 X |
| 2,695,232 | 11/1954 | Richter .................... 162/237 |
| 2,717,195 | 9/1955 | Armstrong .................... 162/24 X |
| 2,733,992 | 2/1956 | Reyerson .................... 162/63 X |
| 3,503,846 | 3/1970 | Nardi .................... 162/236 |
| 3,607,618 | 9/1971 | Uschmann .................... 162/41 X |
| 3,654,070 | 4/1972 | Pradt et al. .................... 162/30 |
| 3,660,225 | 5/1972 | Verreyne et al. .................... 162/65 |
| 3,703,435 | 11/1972 | Schleinofer .................... 162/52 X |
| 3,814,664 | 6/1974 | Carlsmith .................... 162/236 |

FOREIGN PATENTS OR APPLICATIONS 209,964    1/1968    U.S.S.R.

*Primary Examiner*—S. Leon Bashore
*Assistant Examiner*—M. Steven Alvo
*Attorney, Agent, or Firm*—Bernard J. Murphy

[57] ABSTRACT

Gaseous reaction apparatus wherein a portion of the supplied gas is discharged from the reaction vessel at a location below the upper level of a therein contained columnar mass of material wherein the gas is discharged into a receiving chamber extending along the outer periphery of the vessel and open to the lower portion of the vessel through an unrestricted opening being free from screens and filters, and such discharged portion of the gas, with or without cooling, is recirculated back into the upper inlet end of the vessel, thereby controlling the temperature in the vessel by removing or redistributing heat therein. Such apparatus is particularly useful in the gas phase treatment of fibrous material such as the bleaching or delignification of lignin-containing cellulose pulp.

4 Claims, 3 Drawing Figures

GASEOUS REACTION APPARATUS AND PROCESSES INCLUDING A PERIPHERAL GAS RECEIVING CHAMBER AND A GAS RECIRCULATION CONDUIT

The present invention relates to the gaseous reaction of material and more specifically to apparatus and processes particularly suited for the gas phase treatment of fibrous material such as, by way of specific example, the bleaching or delignification of lignin-containing cellulose pulp.

Conventional apparatus and processes for the gaseous reaction of fibrous material, such as the treatment of cellulose pulp with oxygen, generally react the material or pulp in a closed vessel and pre-heat the pulp, prior to its supply into such vessel, to a temperature sufficiently high to initiate the reaction process. The heat of reaction of such processes is sometimes of such great magnitude as to cause undesirably great temperature rise in the closed vessel; however, the temperature of the pulp must, even after such temperature rise, be maintained sufficiently low to avoid the undesirable degradation of the pulp which inherently results from too great heating. Such conventional apparatus and processes generally do not include any provision for removal or redistribution of heat in the closed vessel and attempt to control the temperature in the vessel only by control of the temperature to which the pulp is pre-heated prior to its supply thereinto. Hence, in such apparatus and processes, the temperature of the pulp in the inlet end of the vessel sometimes necessarily must be so low as to require an undesirably long retention time in the vessel for completion of the reaction.

An object of the present invention is to provide new and improved apparatus and processes particularly adapted for permitting control of the temperature in a reaction vessel employed in a gaseous reaction process.

Another object of the invention is to provide new and improved apparatus and processes of the type set forth particularly adapted for permitting redistribution of the heat in the reaction vessel.

Another object is to provide new and improved apparatus and processes of the type set forth particularly adapted for permitting the temperature in the vessel to be maintained at a predetermined maximum level.

Another object is to provide new and improved apparatus and processes of the type set forth particularly adapted for removal of heat from the reaction vessel.

Another object is to provide new and improved apparatus and processes of the type set forth particularly adapted for permitting the material to be rapidly pre-heated in the vessel to a temperature desirable for the reaction process.

Other objects and advantages of the invention will be apparent from the following description taken in connection with the accompanying drawings wherein, as will be understood, the preferred forms of the invention have been given by way of illustration only.

In accordance with the invention, apparatus for the gaseous reaction of material may comprise a vessel, material supply means including material inlet means at one end of said vessel for supplying material thereinto, gas supply means including gas inlet means at said one end of said vessel for supplying reactant gas thereinto and to material therein, material discharge means including material outlet means at the other end of said vessel for discharging material therefrom, said vessel being provided with unrestricted gas discharge opening means for discharging gas from a gas-material mixture in said vessel separately from the material in such mixture, said gas discharge opening means being substantially spaced longitudinally of said vessel from said material and gas inlet means and also spaced longitudinally of said vessel from said material outlet means, and gas recirculation conduit means communicating said gas discharge opening means with said one end of said vessel for recirculating gas discharged through said gas discharge opening means back into said one end of said vessel.

Also, in accordance with the invention, a process for the gaseous reaction of material may comprise the steps of supplying the material into one end of a reaction vessel, supplying gas into said one end of said reaction vessel, retaining the supplied material in said reaction vessel for a time period whereby a portion of the supplied gas reacts with the material and then discharging the material from the vessel, discharging another portion of the supplied gas from the vessel separately from the discharged material and at a location substantially spaced from said one end of the vessel, and recirculating such discharged portion of the gas back into said one end of the vessel.

Referring to the drawings.

Figure 1:
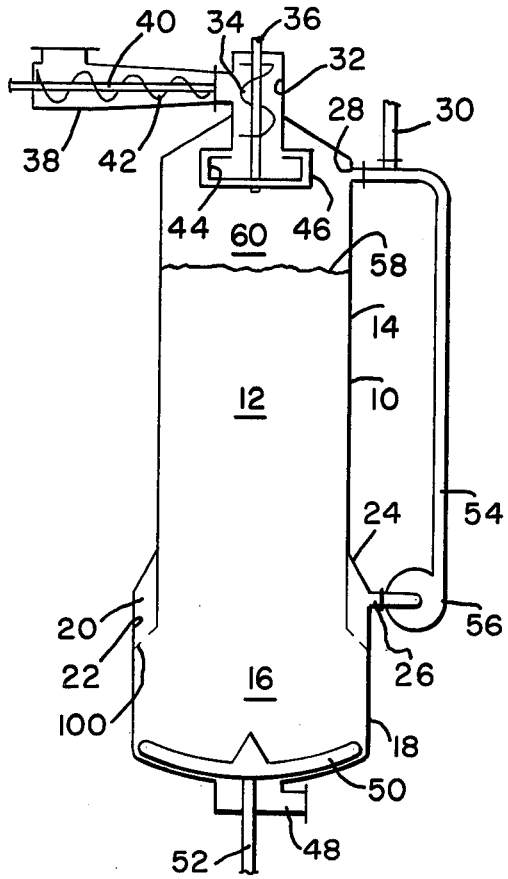
FIG. 1 is a view schematically illustrating one apparatus constructed in accordance with the present invention.

Referring more particularly to the drawings, wherein similar reference characters designate corresponding parts throughout the several views, the embodiment of the apparatus shown in FIG. 1 comprises an elongated, generally vertical or upright, annular reaction vessel 10 which, per se, is of construction similar to that of the reaction vessel described in U.S. Pat. application Ser. No. 288,031, filed Sept. 11, 1972, and assigned to the assignee of the present invention, now U.S. Pat. No. 3,814,664.

The reaction vessel 10 includes an upper portion 12 peripherally bounded by a generally vertical annular wall 14, and a therebelow adjoining lower portion 16 peripherally enclosed within a generally vertical annular wall 18. The upper portion 12 of the vessel 10 is formed of horizontal cross-section or cross-sectional area substantially less than that of the communicating lower portion 16; and the annular wall 18 is upwardly extended to project circumferentially around the lower end of the annular wall 14 radially spaced therefrom by a relatively large cross-section annular gas receiving chamber 20 which extends peripherally around the lower end of the vessel upper portion 12 and throughout its length is closed by the wall 14 from direct connection thereto. The annular lower end 22 of the gas receiving chamber 20 surrounds the lower end of the vessel upper portion 12 to be substantially spaced from the vessel upper end, and is entirely open to serve as an unrestricted, large annular opening through which, during operation of the apparatus, gas is continuously discharged. The upper end of the chamber 20 is closed by an annular closure wall 24; however, below the closure wall 24, a gas discharge outlet 26 is connected to the chamber 20 for discharging gas from the latter. The chamber 20, chamber lower end 22 and gas outlet 26 are free from screens and similar filtering media such as might restrict the flow of gas therethrough; and the screen plugging problems and screen cleaning difficulties, inherent in the provision of a screen at their locations, are resultantly avoided.

The upper end of the vessel upper portion 12 (that is, the upper inlet end of the vessel 10) is provided with at least one gas inlet 28 which communicates such upper portion 12 with a gas supply conduit 30, in turn, communicating with a source (not shown) of the gas or gaseous reagent to be employed during the operation of the apparatus. The upper end of the vessel upper portion 12 is further provided with a material inlet or inlet conduit 32 which is connected to such upper end generally centrally of the vessel 10. The inlet conduit 32 contains a feed screw 34, mounted on a supporting shaft 36 rotatably driven by a driving motor (not shown), which is adapted for downwardly feeding the material into the vessel upper portion 12. The inlet conduit 32 is connected to a supply conduit 38 including a portion tapering or progressively narrowing in cross-section in the direction of the passage of material to the vessel 10 therethrough. A rotatably driven shaft 40 is coaxially disposed in the supply conduit 38 and in the tapering cross-section portion thereof carries a feed-and-compaction screw 42. Hence, during operation of the apparatus, the driven rotation of the feed-and-compaction screw 42 in the tapering portion of the conduit 38 causes compaction of the material in the supply conduit 38 to prevent the flow of gasses therethrough, while the screws 34, 42 feed the material into the upper end of the vessel upper portion 12.

The upper end of the vessel upper portion 12 contains means particularly adapted for disintegrating, breaking-up and fluffing the compacted material supplied through the inlet conduit 32, such means also spreading the disintegrated, broken-up and fluffed material across the cross-section of the vessel upper portion 12. As illustrated, such means is of the type described in U.S. Pat. application Ser. No. 272,960, filed July 18, 1972, assigned to the assignee of the present invention now U.S. Pat. No. 3,785,577, and comprises an inner annulus or ring 44 of arcuately spaced apart rotary pins connected to the shaft 36 for driven rotation therewith, and a coaxial, radially spaced, outer annulus or ring 46 of arcuately spaced apart stationary pins. During operation of the apparatus, the annulus 44 of rotary pins is continuously rotatably driven relative to the annulus 46 of stationary pins; and material supplied through the inlet conduit 32 is disintegrated or fluffed by the relative rotation of the pins and thence discharged outwardly through the spaces between the adjacent ones of the pins to be resultantly spread in fluffed, disintegrated or broken-up condition across the cross-section of the vessel 10. It will be understood that this illustrated material disintegrating and spreading means, and also the beforedescribed material compacting and supplying means, are shown as being of described construction only for the purposes of illustration and could be of other construction suitable to perform their intended functions. The lower end of the vessel lower portion 16 (that is, the lower discharge end of the vessel) is provided with a reacted material outlet or outlet conduit 48 and contains a bottom scraper 50 rotatably driven through a shaft 52 for discharging the material through such outlet 48.

In accordance with the present invention, the apparatus further includes means for redistributing heat in the reaction vessel 10 during the reaction process to control the temperature therein. More specifically, as shown in FIG. 1, a recirculation conduit 54, external to the vessel 10, is connected at opposite ends to the gas outlet 26 and the gas inlet 28 for recirculating the gas discharged through the gas outlet 26 back through the gas inlet 28 into the upper end of the vessel. The recirculation conduit 54, moreover, is provided with a conventional centrifugal blower 56 adapted for blowing the recirculated gas through the recirculation conduit 54 to the gas inlet 28; and, as illustrated, the gas supply conduit 30 is connected to the gas inlet 28 through the recirculation conduit 54 whereby the recirculated gas and the gas supplied by the conduit 30 are supplied intermixed through the inlet 28.

A description of the operation of the beforedescribed apparatus in the oxygen delignification of cellulose pulp hereinafter follows, it being estimated that the heat of such reaction is sufficient to raise the temperature of pulp in the vessel 10 about eighty degrees Fahrenheit and it being understood that the maximum temperature in the vessel 10 during such reaction must be maintained below about two-hundred fifty degrees Fahrenheit to prevent degredation of the pulp.

Throughout such operation, the shafts 36, 40, 52, are continuously rotatably driven to provide continuous rotation of the screws 34, 42, the annulus 44 of rotary pins and the bottom scraper 50. Pulp being reacted is retained in the vessel 10 for the period of time suitable or desirable for the reaction in a porous, gas permeable pile or plug of fluffed pulp, which pile has its upper end generally as indicated by the reference numeral 58 and spaced below the upper end of the vessel upper portion 12 by a gas space 60. The pulp moves progressively downwardly in such porous plug form as reacted pulp is discharged from the bottom of the plug through the outlet 48. The pulp plug, thus maintained in the vessel 10, adjacent its upper end extends the full cross-section of the vessel upper portion 12 and expands in cross-section in the vessel lower portion 16 to the full width of the latter, thereby causing the porous pulp plug to have a large annular interface 100 with the gas receiving chamber 20.

Pulp to be reacted is continuously supplied to the feed-and-compaction screw 42 which compacts the pulp in the tapering portion of the supply conduit 38 and thereby forms a non-porous plug of the pulp upstream of the vessel 10 to prevent flow of gas to the vessel 10 through the conduit 38 and also prevent loss of gas from the vessel 10 through the conduit 38. The feed screw 34 continuously receives this plug of pulp from the conduit 38 and feeds the pulp downwardly to the therebelow annuli 44, 46 of relatively rotating pins. Such pins, due to their relative rotation, disintegrate and fluff the pulp to a condition suitable for the reaction and the formation in the vessel 10 of the beforedescribed porous, gas permeable pulp plug. The annuli 44, 46 of pins, furthermore, discharge the pulp in a radially outward flow between adjacent ones of the pins whereby the pulp showers downwardly through the space 60 onto the upper end 58 of the therebelow plup plug. The temperature of this supplied plup may be, for example, around one-hundred seventy degrees Fahrenheit.

Simultaneously, reaction gas or oxygen is continuously supplied at a controlled rate from the gas supply conduit 30 through the gas inlet 28 into the gas space 60 and to the pulp showering downwardly therethrough. Hence, the pulp during its downward showering is exposed to the introduced reaction gas and a large portion of the reaction gas is absorbed into the pulp at this time. The unabsorbed gas continues downwardly through the porous pulp plug at a velocity which is substantially greater than that of the downward movement of the pulp through the plug, an additional volume of the reaction gas being absorbed into the pulp during such downward flow, and the remaining unabsorbed gas at the level of the interface 100 passes upwardly through the gas discharge opening 22 into the gas chamber 20 and thence is recirculated through the gas recirculation conduit 54 by the blower 56 into the upper end of the vessel upper portion 12. The recirculated gas is, as will be noted, supplied into the gas space 60 through the gas inlet 28 intermixed with gas from the gas supply conduit 30. The major portion of the heat contained in the recirculated gas is in the form of water vapor originating from the lower end of the upper vessel portion 12 where, due to heat of reaction, evaporation of water from the hot pulp occurs. The recirculated gas entering the gas space 60 has a higher temperature than the entering pulp and, due to the high turbulence in the gas space 60 and the large exposed surface area of the pulp showering downwardly therethrough, heat transfer from the recirculated gas to such pulp by condensation of the water vapor contained in the recirculated gas occurs almost instantaneously whereby substantially equalized temperature of the recirculated gas and the fluffed pulp is attained prior to the deposit of the pulp on the upper level of the pulp bed 58. The amount of this heat transfer from the recirculated gas to the pulp, is, of course, dependent upon the volume of gas recirculated. However, it has been calculated for a case where the temperature rise within the pulp bed 58 due to heat of reaction would be eighty degrees Fahrenheit without gas recirculation, that recirculation of three-tenths to eight-tenths of a pound of oxygen per pound of pulp would limit the temperature rise within the pulp bed 58 to forty to sixty degrees Fahrenheit, while elevating the temperature of the entering pulp in the gas space 60 by twenty to forty degrees Fahrenheit (for example, from one-hundred seventy degrees Fahrenheit to a range of one-hundred ninety to two-hundred ten degrees Fahrenheit) - that is, to a temperature level that will immediately begin a fast process reaction. Within the pulp bed 58, the downward flow of gas acts to limit the temperature rise by evaporating water and absorbing heat generated by heat reaction from the hot pulp, and thereby prevents overheating and degradation of the pulp.

Figure 2:
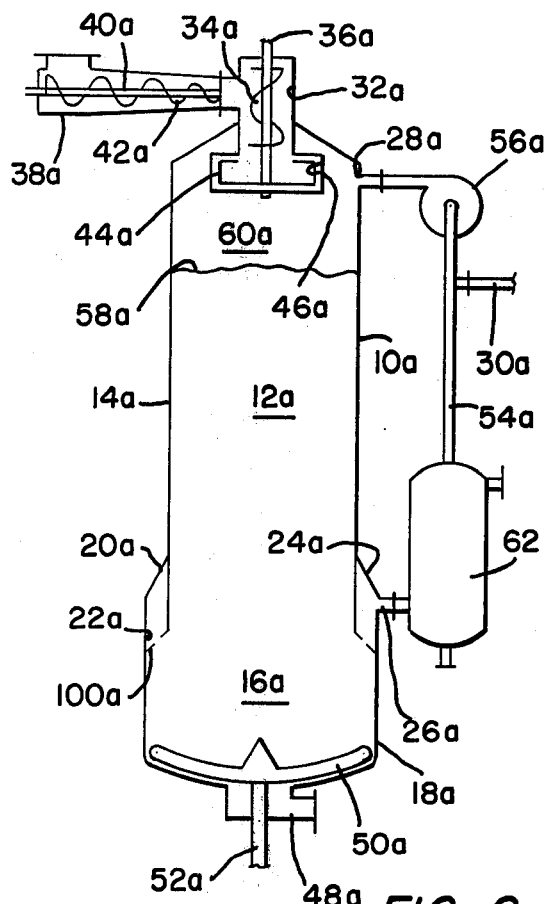
FIG. 2 is a view schematically illustrating a second apparatus constructed in accordance with the invention.

FIG. 2, wherein parts similar to those beforedescribed are designated by the corresponding reference numerals followed by the suffix *a* illustrates an embodiment of the apparatus particularly adapted for employment in applications where cooling of the recirculated gas is necessary or desirable. In the FIG. 2 embodiment, a cooler, designated generally as 62, is interposed in the gas recirculation conduit 54a for cooling the recirculated gas during its flow through such conduit 54a. The cooler 62 may be of any suitable conventional construction such as, for example, an indirect type heat exchanger or a direct type spray condenser and enables the temperature of the recirculated gas to be sufficiently lowered as to provide control of the temperature in the vessel 10a, it being believed that such cooling of the recirculated gas is particularly beneficial in applications such as, for example, the gas phase chlorination of cellulose pulp. Aside from the cooler 62, the only differences between the apparatus of FIG. 2 and FIG. 1 are that the former locates the blower 56a adjacent to the gas inlet 28a and connects the gas supply conduit 30a to the recirculation conduit 54a upstream of the blower 56a. The operation of the apparatus shown in FIG. 2 is believed to be apparent in view of the beforegiven description of the operation of the apparatus of FIG. 1.

Figure 3:
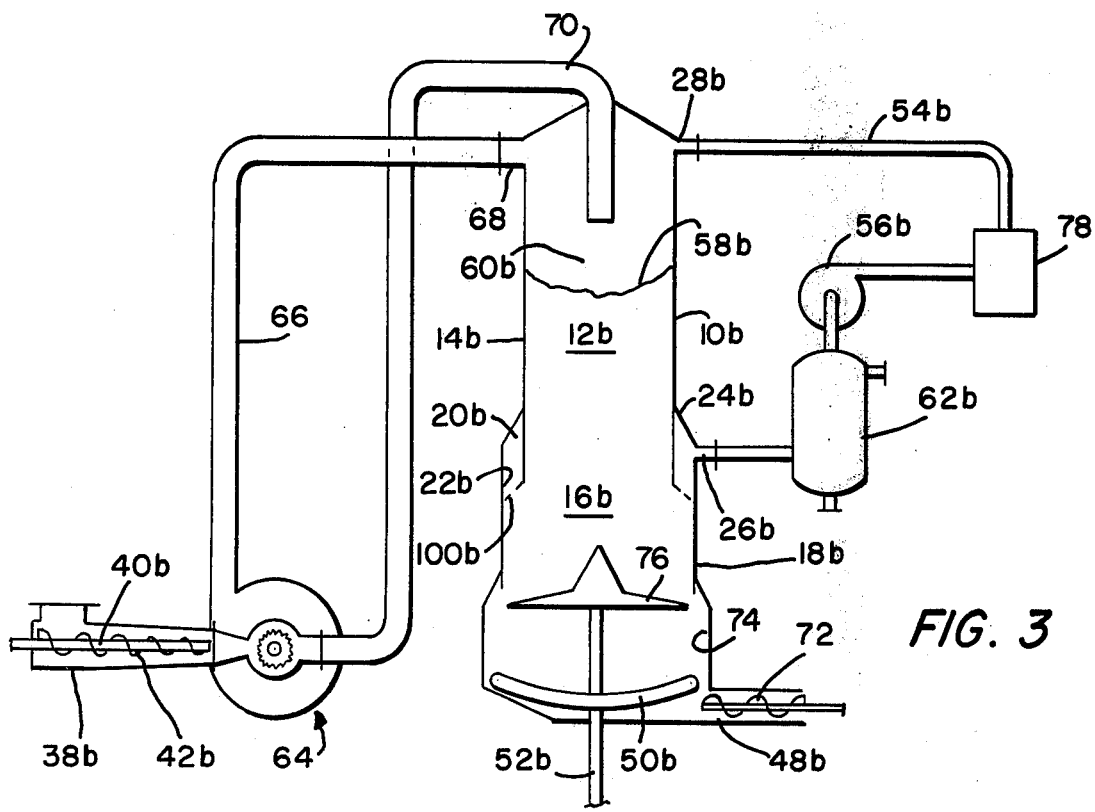
FIG. 3 is a view schematically illustrating a third apparatus constructed in accordance with the invention.

FIG. 3, wherein parts similar to those of the beforedescribed apparatus of FIGS. 1 and 2 are designated by the corresponding reference numerals followed by the suffix *b*, illustrates an embodiment of the apparatus particularly suited for employment in instances in which the supplied reactant gas must be diluted by an inert carrier gas such as nitrogen, air or steam. As shown in FIG. 3, the fluffing of the pulp occurs in a fluffer 64 external to the vessel 10b and, per se, of construction similar to that of the disintegrating-and-blowing means described in U.S. Pat. application Ser. No. 288,031, filed Sept. 11, 1972, and assigned to the assignee of the present invention now U.S. Pat. No. 3,814,664. The fluffer 64 may include coaxial annuli of rotating and stationary pins and is connected to the material inlet 68 at the upper end of the vessel upper portion 12b by a material supply conduit 66 while also connected to such upper end through a gas discharge conduit 70 arranged to discharge gas from the vessel upper end, whereby such discharged gas blows the fluffed or disintegrated pulp from the fluffer 64 through the conduit 66 into the upper end of the vessel upper portion 12b. The discharge outlet 48b at the lower end of the vessel 10b is provided with a rotatably driven discharge screw 72; and the vessel 10b beneath the vessel portion 16b includes a discharge chamber or section 74 separated from the lower end of the vessel portion 16b by a rotatably driven discharge platform 76 which controls the discharge of pulp from the bottom of the pulp plug to the discharge chamber 74 around the platform 76. The gas recirculation conduit 54b, as shown, may contain a cooler 62b and communicates with the gas inlet 28b through a conventional gas generating system designated generally as 78 and, per se, of any suitable conventional construction.

In the operation of the apparatus of FIG. 3, the gas discharged from the gas chamber 20b to the gas recirculation conduit 54b is primarily inert carrier gas although preferably having therewith a residue of the reactant gas to prevent the reaction from being undesirably slow adjacent the lower end of the vessel upper portion 12b, and is recirculated to the gas generation system 78 which adds additional reactant gas to the carrier gas prior to resupply through the gas inlet 28b into the gas space 60b. The FIG. 3 embodiment is believed to be particularly useful in the treatment of fluffed pulp in gas phase with chlorine monoxide and chlorine dioxide, but of course is not limited merely to these applications. It will be understood that, although the FIG. 3 embodiment has been shown and described as including a fluffer 64 external to the vessel 10b, it could alternatively include a fluffer within such vessel 10b and, for example, of the relatively rotating pin construction shown in the upper ends of the vessels 10, 10a of the embodiments of FIGS. 1 and 2. Furthermore, such fluffers shown in the embodiments of FIGS. 1 and 2 could, if desired, be replaced by an external fluffer such as that shown as 64 in the embodiment of FIG. 3.

From the preceding description it will be seen that the invention provides new and improved apparatus and processes for accomplishing all of the beforestated objects and advantages. It will be understood, however, that although only three embodiments of the invention have been illustrated and hereinbefore described, the invention is not limited merely to these three embodiments, but rather comtemplates other embodiments and variations within the scope of the following claims.

I claim:

1. Apparatus for the gaseous reaction of material, comprising a generally vertical vessel, material supply means connected to the upper end of said vessel for supplying material into such upper end, gas supply means connected to the upper end of said vessel for supplying gas into such upper end and to material therein, means for discharging material from the lower end of said vessel, said vessel including an upper portion and a therebelow adjoining lower portion of cross-section greater than said upper portion, the juncture of said vessel portions being substantially spaced intermediate the upper and lower ends of said vessel, the outer periphery of said vessel adjacent said juncture of said vessel portions being provided with gas discharge means open to said vessel for discharging gas therefrom, said gas discharge means including a gas receiving chamber extending along the outer periphery of said vessel and open to said vessel lower portion through an unrestricted opening to receive gas therefrom, said gas discharge means further including gas outlet means connected to said chamber for discharging gas from said chamber; said chamber, said unrestricted opening and said gas outlet means being free from screens and similar filtering media, gas recirculation conduit means connecting said gas outlet means with said upper end of said vessel for recirculating gas discharged from said vessel through said gas outlet means back into said upper end of said vessel, and blower means connected to said gas recirculation conduit means for causing gas discharged by said gas outlet means to flow through said gas recirculation conduit means towards said upper end of said vessel.

2. Gaseous reaction apparatus according to claim 1, further comprising cooler means connected to said gas recirculation conduit means for cooling the recirculated gas during its flow through such conduit means.

3. Gaseous reaction apparatus according to claim 1, wherein said gas supply means comprises at least one gas inlet at the upper end of said vessel and a source of gas communicating with said gas inlet to supply gas therethrough, said gas recirculation conduit means being connected to said gas inlet to recirculate the discharged gas therethrough.

4. Gaseous reaction apparatus according to claim 1, wherein said material supply means comprises at least one material inlet at the upper end of said vessel, material supply conduit means communicating with said material inlet for supplying material therethrough, compacting means operatively communicating with said material supply conduit means for compacting material upstream of said material inlet, and material disintegrating means operatively communicating with said material compacting means downstream of said material compacting means for disintegrating the material compacted by said material compacting means.

\* \* \* \* \*